United States Patent [19]
Deck et al.

[11] Patent Number: 5,657,949
[45] Date of Patent: Aug. 19, 1997

[54] METHOD AND APPARATUS FOR PROVIDING A DYNAMIC THRUST ASYMMETRY RUDDER COMPENSATION COMMAND WITH NO DIRECT THRUST MEASUREMENT

[75] Inventors: Timothy D. Deck, Renton; David W. Lochtie, Bellevue, both of Wash.

[73] Assignee: The Boeing Company, Seattle, Wash.

[21] Appl. No.: 438,625

[22] Filed: May 10, 1995

[51] Int. Cl.$^6$ ........................................... B64C 13/16
[52] U.S. Cl. ........................ 244/76 A; 244/76 R; 244/184
[58] Field of Search ............................ 244/76 R, 76 A, 244/178, 182, 188, 194, 195, 183, 192; 364/433, 434

[56] References Cited

U.S. PATENT DOCUMENTS

| | | | |
|---|---|---|---|
| 3,777,242 | 12/1973 | Tribuno et al. | 244/192 |
| 3,921,941 | 11/1975 | Lehfeldt | 244/182 |
| 4,106,730 | 8/1978 | Spitzer et al. | 244/182 |
| 4,148,452 | 4/1979 | Niessen et al. | 244/195 |
| 4,648,569 | 3/1987 | Stewart | 244/75 R |
| 4,935,682 | 6/1990 | McCuen . | |
| 5,036,469 | 7/1991 | Pelton | 244/183 |
| 5,113,346 | 5/1992 | Orgun et al. | 244/183 |

*Primary Examiner*—Andres Kashnikow
*Assistant Examiner*—Tien Dinh
*Attorney, Agent, or Firm*—Christensen, O'Connor, Johnson & Kindness PLLC

[57] ABSTRACT

A method and apparatus for producing a dynamic thrust asymmetry airplane rudder compensation command with no direct thrust measurement is disclosed. An excess thrust estimate based on measured acceleration along the flight path of the airplane and measured vertical speed of the airplane is low pass filtered (11) to attenuate noise from the inertially derived data. The low pass filtered data is further filtered by a washout filter (15) to produce data that is sensitive only to changes in the excess thrust estimate. The input to the washout filter is frozen (13) and the output of the washout filter reduced to zero if the go-around or flare modes of the control system of the airplane are active or if the thrust asymmetry compensation feature of the primary flight computer is armed. The output of the washout filter is also zeroed when both engines are running, or multiplied by either −1 or +1 when one engine is out. Whether the multiplication is by −1 or +1 depends upon which engine is out. The result is a rudder compensation command that is limited to prevent an excessive rudder compensation command from being produced.

26 Claims, 1 Drawing Sheet

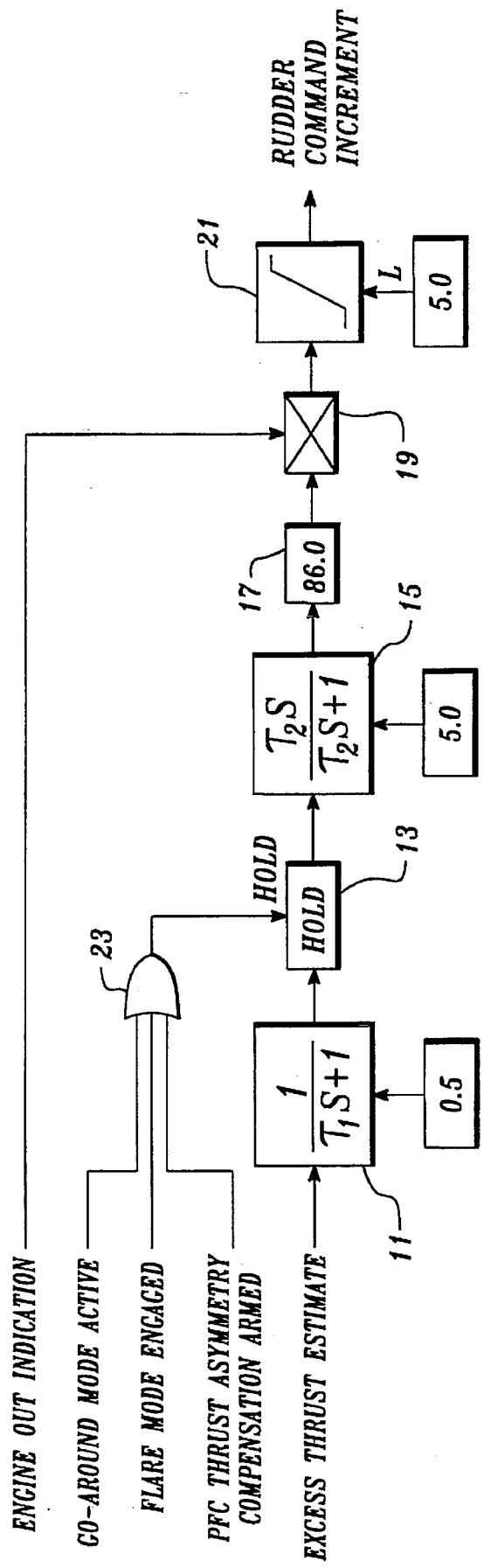

«5,657,949»

METHOD AND APPARATUS FOR PROVIDING A DYNAMIC THRUST ASYMMETRY RUDDER COMPENSATION COMMAND WITH NO DIRECT THRUST MEASUREMENT

TECHNICAL AREA

This invention relates to airplane control systems and, more particularly, to airplane rudder control systems.

BACKGROUND OF THE INVENTION

For various reasons, it occasionally becomes necessary for modem twin-engine commercial jet transport airplanes to depend entirely on the thrust produced by one engine. Engine out operation most commonly results from damage to an engine occurring during flight. While modem airplane autopilots can effectively control an airplane with one engine out, speed control, particularly during coupled approaches with one engine out, often requires large amplitude responses from the operating engine to compensate for medium to heavy turbulence. The resulting variations in thrust produced by the single operating engine produce significant yaw moments that must be balanced by appropriate rudder deflections. While modem autopilot rudder command algorithms respond to yaw rate and heading changes, they do not respond to differential thrust or differential throttle position. As a result, rudder command changes do not occur rapidly enough to prevent unacceptable cross track error due to changes in differential thrust. The present invention is directed to providing a method and apparatus that overcomes this problem.

SUMMARY OF THE INVENTION

In accordance with this invention, a method and apparatus for producing an airplane dynamic thrust asymmetry rudder compensation command with no direct thrust measurement is disclosed. An excess thrust estimate based on measured acceleration along the flight path of the airplane and measured vertical speed of the airplane is low pass filtered to attenuate noise from the derived data. The low pass filtered data is further filtered by a washout filter to produce data that changes only due to changes in the excess thrust estimate. The output of the washout filter is multiplied by a gain factor that converts excess thrust into degrees of rudder movement. The restfit is a rudder compensation command suitable for modifying the rudder command of an autopilot or other airplane control system in a manner that produces a yaw deflection that compensates for the thrust differential produced when one engine of a two-engine airplane is not operating.

In accordance with further aspects of this invention, the input to the washout filter is frozen, whereby the output of the washout filter is reduced to zero if certain modes of operation of an airplane's autopilot or other flight control systems are active. Specifically, the input of the washout filter is frozen and the output reduced to zero if the go-around or flare modes of operation of the autopilot of the airplane are active or if the thrust asymmetry compensation function of the primary flight computer is armed.

In accordance with other aspects of this invention, the output of the washout filter is zeroed when both engines are running or multiplied by either −1 or +1 when one engine is out. As a result, the present invention is only active when one engine is not running.

In accordance with still further aspects of this invention, preferably, the rudder compensation command produced by the invention is limited to prevent an excessive rudder compensation command from being produced.

As will be readily appreciated from the foregoing description, the invention provides a method and apparatus for producing a dynamic thrust asymmetry compensation rudder command with no direct thrust measurement. The method and apparatus produces a command suitable for incrementally modifying the rudder command of an autopilot system in a manner that compensates for the failure of one engine of a twin-engine aircraft to produce thrust.

BRIEF DESCRIPTION OF THE DRAWINGS

The foregoing aspects and many of the attendant advantages of this invention will become more readily appreciated as the same becomes better understood by reference to the following detailed description when taken in conjunction with the accompanying FIGURE, which illustrates a preferred embodiment of the invention.

DETAILED DESCRIPTION OF THE PREFERRED EMBODIMENT

While, as will be better understood from the following description, the invention was designed for use in a "fly-by-wire" airplane control system, and is described in connection with such a system, it is to be understood that the invention can be incorporated in other types of airplane control systems, if desired. Further, while, as is conventional, the invention is illustrated and described in the form of a control law comprising discrete blocks designed to accomplish specific functions, it is to be understood that the invention can be actually implemented in various ways. For example, the various functions of the illustrated control law can be carried out by a suitably programmed digital computer system. Alternatively, the functions can be carded out by digital or analog circuits. Also, while the invention was developed for and is described in connection with a twin-engine airplane, it could be used with airplanes with a larger number of engines.

The FIGURE illustrates the presently preferred embodiment of the invention, which comprises a low pass filter 11, a hold element 13, a washout filter 15, gain element 17, a multiplier 19, a limiter 21, and a three-input OK gate 23.

The low pass filter 11 receives an excess thrust estimate that approximates the thrust of the engines minus the drag of the airplane divided by the weight of the airplane [(Thrust-Drag)/weight]. There are many methods of making an excess thrust estimate suitable for use by the invention. In the case of the Boeing 777 airplane, a combination of inertial and air data measurements are used. More specifically, in the Boeing 777 airplane an excess thrust estimate value is derived based on the formula:

$$\text{excess thrust estimate} = \frac{\dot{V}}{g} + \frac{\dot{H}}{V_{tas}} \qquad (1)$$

where:
$\dot{V}$=rate of change of speed in ft/sec²
$g$=gravitational constant in ft/see²
$\dot{H}$=inertial altitude rate in ft/sec²
$V_{tas}$=true airspeed in ft/sec2

Returning to the FIGURE, the Laplace transform of the low pass filter is:

$$\frac{1}{\tau_1 s + 1} \qquad (2)$$

where $\tau_1$ is in seconds and can vary from aircraft to aircraft. In the case of the Boeing 777 airplane, $\tau_1$=0.5 seconds. The low pass filter removes sensor noise from the excess thrust estimate.

The output of the low pass filter 11 is applied to the input of the hold element 13. The hold element has a hold input that is connected to the output of the three-input OR gate 23. The related input of the three-input OR gate 23 goes high when any of three monitored conditions is functional. One monitored condition is entitled "Go-Around Mode Active," the second is "Flare Mode Engaged," and the third is "PFC Thrust Asymmetry Compensation Armed." Thus, if the go-around mode of the autopilot is active, the related input of the three-input OR gate 23 is high. If the flare mode of the autopilot is engaged, the related input of the three-input OR gate is high. Or, if the primary flight computer (PFC) thrust asymmetry compensation function is armed, the related input of the three-input OR gate is high.

If one or more of the inputs of the three-input OR gate is high, the hold element is placed in a hold state. In the hold state, the output of the hold element 13 is held or frozen. When all of the inputs of the three-input OR gate are low, the output of the three-input OR gate 23 is low. When the output of the three-input OR gate is low, the output of the low pass filter 11 passes through the hold element 13.

The output of the hold element 13 is applied to the input of the washout filter 15. The Laplace transform of the washout filter is:

$$\frac{\tau_2 S}{\tau_2 S + 1} \quad (3)$$

where $\tau_2$ is in seconds and can vary from airplane to airplane. In the case of the Boeing 777 airplane, $\tau_2 = 5.0$ seconds.

The washout filter 15 produces an output signal that is sensitive only to changes in the excess thrust estimate. The output of the washout filter, in essence, forms a rudder command that, when combined with the autopilot's rudder control command, dynamically nulls the yawing moment produced by differences in the thrust between two engines, i.e., the differential thrust between the engines. Prior to being summed with the rudder control command, the output of the washout filter is first gain corrected to convert excess thrust into degrees of rudder movement and then limited.

While the gain correction will vary from airplane to airplane, as shown in gain element 17 in the FIGURE, the gain adjustment for a Boeing 777 is 86.0. The output of the gain element 17 is applied to one input of a multiplier 19.

The second input, the multiplier 19, is defined as an engine out indication. The engine out indication is zero when both engines are running and either +1 or −1 when one engine is out. Whether the input is +1 or −1 is determined by which of the two engines is out. Because the engine out indication is zero when both engines are running, the algorithm or control law illustrated in the FIGURE is only active when one engine is not running, i.e., when one engine is out.

The output of the multiplier 19 is applied to the input of the limiter 21. The limiter limits the rudder compensation command to prevent an excess rudder compensation command from being produced. While various limits can be utilized, preferably, the rudder compensation command is limited to 5.0 degrees.

As will be readily appreciated from the foregoing description, the invention provides a rudder compensation command that can be used to incrementally adjust the rudder command produced by an autopilot control system so as to dynamically null the yawing moment produced by the differences in the thrust between two engines when one of the engines is out. The invention requires no direct measurement of engine thrust or of differential thrust. Rather, the invention uses an excess thrust estimate in combination with the knowledge that an engine is inoperative. That is, the invention uses an excess thrust estimate derived by an autopilot to create a command that can be used to incrementally change the autopilot's rudder command in a manner that dynamically nulls the yawing moment produced by the differences in thrust between two engines of an airplane.

The invention is only operative when one engine is out. Further, the rudder compensation command is reduced to zero if certain functions are active. The rudder compensation command is reduced to zero when these functions are active because the hold element freezes the input of the washout filter, resulting in the output of the washout filter reducing to zero.

While a preferred embodiment of the invention has been illustrated and described, it is to be understood that the invention can be practiced otherwise than as specifically described herein. For example, since the system illustrated in the FIGURE is essentially linear, the various elements (or their functions) can be performed in sequences other than the one illustrated.

The embodiments of the invention in which an exclusive property or privilege is claimed are defined as follows:

1. A method of producing a thrust asymmetry rudder compensation command for an airplane comprising:
   low pass filtering an inertially based excess thrust estimate to remove undesired noise;
   washout filtering said inertially based excess thrust estimate; and
   gain adjusting said inertially based excess thrust estimate to convert excess thrust into degrees of rudder movement.

2. The method claimed in claim 1, wherein the low pass filtered, inertially based excess thrust estimate is held prior to washout filtering if predetermined airplane control functions are enabled.

3. The method claimed in claim 2, wherein said airplane includes an autopilot and wherein said predetermined airplane control functions include the go-around mode of said autopilot being active.

4. The method claimed in claim 3, wherein said predetermined airplane control functions also include the flare mode of said autopilot being engaged.

5. The method claimed in claim 4, wherein said airplane also includes a primary flight computer and wherein said predetermined airplane control functions also include the thrust asymmetry compensation function of said primary flight computer being armed.

6. The method claimed in claim 2, wherein said airplane includes an autopilot and wherein said predetermined airplane control functions include the flare mode of said autopilot being engaged.

7. The method claimed in claim 6, wherein said airplane also includes a primary flight computer and wherein said predetermined airplane control functions also include the thrust asymmetry compensation function of said primary flight computer being armed.

8. The method claimed in claim 2, wherein said airplane includes a primary flight computer and wherein said predetermined airplane control functions include the thrust asymmetry compensation function of said primary flight computer being armed.

9. The method claimed in claim 2, including multiplying said gain adjusted, washout filtered, inertially based excess thrust estimate by an engine out indication.

10. The method claimed in claim 9, wherein said engine out indication has three states, zero, +1, and −1, where zero indicates that all of the engines of said airplane are running, +1 indicates that one of the engines of said airplane is not running, and −1 indicates that another engine of said airplane is not running.

11. The method claimed in claim 9, including limiting said gain adjusted, washout filtered, inertially based excess thrust estimate.

12. The method claimed in claim 1, including multiplying said gain adjusted, washout filtered, inertially based excess thrust estimate by an engine out indication.

13. The method claimed in claim 12, wherein said engine out indication has three states, zero, +1, and −1, where zero indicates that all of the engines of said airplane are running, +1 indicates that one of the engines of said airplane is not running, and −1 indicates that another engine of said airplane is not running.

14. The method claimed in claim 1, including limiting said gain adjusted, washout filtered, inertially based excess thrust estimate.

15. Apparatus for producing a thrust asymmetry rudder compensation command for an airplane autopilot comprising:

a low pass filter for receiving and filtering an inertially based excess thrust estimate to remove undesired noise;

a washout filter for receiving and filtering said inertially based excess thrust estimate; and a gain adjuster for receiving and gain adjusting said inertially based excess thrust estimate to convert excess thrust into degrees of rudder movement.

16. The apparatus claimed in claim 15, including a hold element located between said low pass filter and said washout filter for holding the output of said low pass filter when the autopilot of said airplane is in a predetermined mode of operation.

17. The apparatus claimed in claim 16, wherein said predetermined mode of operation includes Go-Around Mode Active.

18. The apparatus claimed in claim 17, wherein said mode of operation includes Flare Mode Engaged.

19. The apparatus claimed in claim 18, wherein said hold element is also enabled if the primary flight computer thrust asymmetry compensation mode of operation is armed.

20. The apparatus claimed in claim 16, wherein said mode of operation includes Flare Mode Engaged.

21. The apparatus claimed in claim 20, wherein said hold element is also enabled if the primary flight computer thrust asymmetry compensation mode of operation is armed.

22. The apparatus claimed in claim 16, wherein said hold element is also enabled if the primary flight computer thrust asymmetry compensation mode of operation is armed.

23. The apparatus claimed in claim 16, including a multiplier for multiplying the output of said gain adjuster by the state of an engine out indication, said state including a zero state, a +1 state and a −1 state; wherein zero indicates that all the engines of said airplane are operating, +1 indicates that one of the engines of said airplane is not operating, and −1 indicates that another engine of the airplane is not operating.

24. The apparatus claimed in claim 23, including a limiter for limiting the magnitude of said gain adjusted, washout filtered, inertially based excess thrust estimate.

25. The apparatus claimed in claim 15, including a multiplier for multiplying the output of said gain adjuster by the state of an engine out indication, said state including a zero state, a +1 state and a −1 state, wherein zero indicates that all the engines of said airplane are operating, +1 indicates that one of the engines of said airplane is not operating, and −1 indicates that another engine of the airplane is not operating.

26. The apparatus claimed in claim 15, including a limiter for limiting the magnitude of said gain adjusted, washout filtered, inertially based excess thrust estimate.

* * * * *

UNITED STATES PATENT AND TRADEMARK OFFICE
CERTIFICATE OF CORRECTION

| | | |
|---|---|---|
| PATENT NO. : | 5,657,949 | |
| DATED : | August 19, 1997 | |
| INVENTOR(S) : | T.D. Deck et al. | |

It is certified that error appears in the above-indentified patent and that said Letters Patent is hereby corrected as shown below:

COLUMN  LINE

6           17         After "a-1 state" delete ";" and insert --,--
(Claim 23, line 4)

Signed and Sealed this

Tenth Day of February, 1998

Attest:

BRUCE LEHMAN

Attesting Officer          Commissioner of Patents and Trademarks